United States Patent Office 2,778,797
Patented Jan. 22, 1957

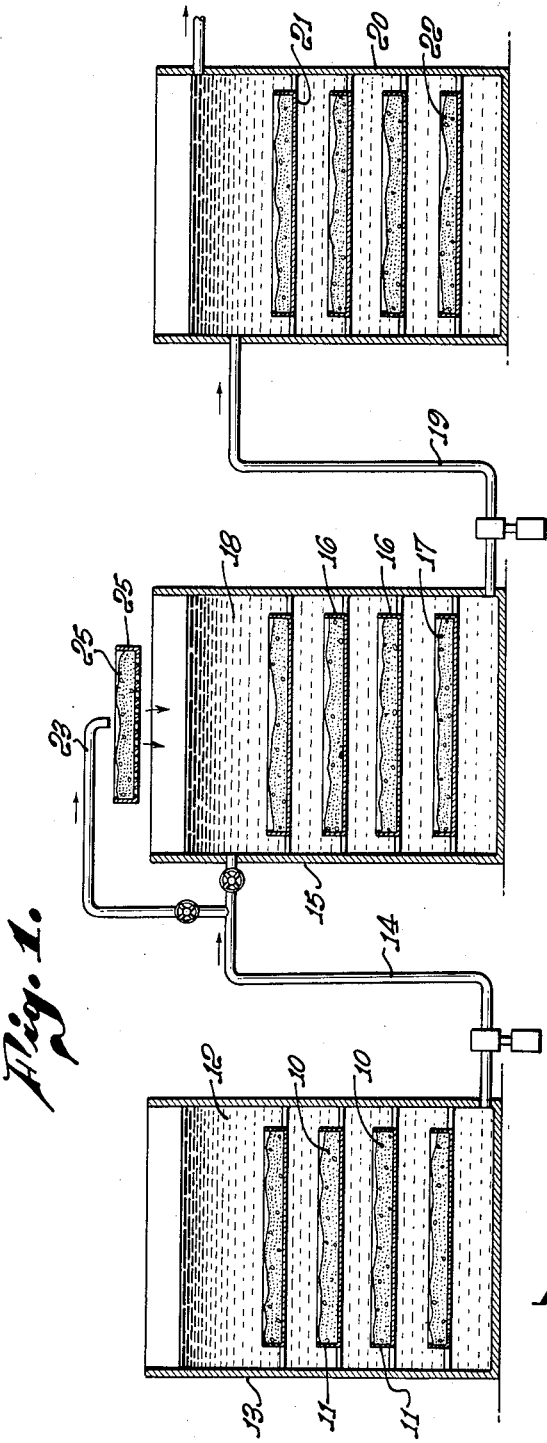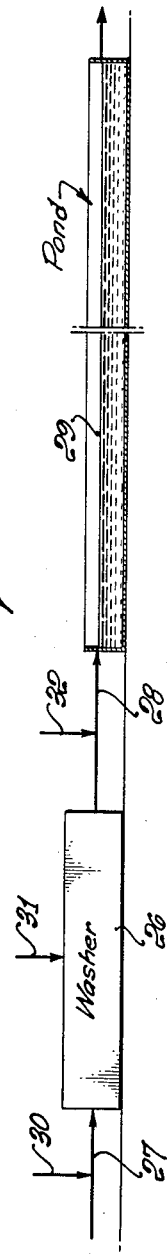
Ralph W. Dickenson,
INVENTOR.
ATTORNEY.

2,778,797

METHOD OF TREATING WATERS CONTAMINATED WITH ORGANIC MATERIALS

Ralph W. Dickenson, Anaheim, Calif.

Application November 24, 1952, Serial No. 322,321

15 Claims. (Cl. 210—2)

This invention has to do generally with the treatment of waters contaminated with organic materials, such as sewage and vegetable matters, particularly, though not necessarily, in a green, juicy or undried condition, for the prevention of putrifaction of such organic materials and promotion of their biological disintegration and desirable mode of conversion to an ultimate freely dispersible form.

The invention has among its various uses and adaptations the treatment of waters used for the washing or carrying of fruit or vegetable produce or wastes such, for example, as the produce wash and refuse carrier waters used in plants packing lettuce, cabbage, cauliflower, tomatoes, etc., in citrus and deciduous fruit washing and packing plants, as well as in fruit and vegetable canneries. Occasionally the wash and carrier waters from such plants may contain or be joined by waters carrying other organic putrifiable or putrid materials such as animal packing or slaughter house wastes, and in some cases sewage. In such instances the invention is applicable to the treatment and putrifaction prevention or conversion to a non-putrified condition, of these other organic materials as well as those of vegetable matter, since the latter described extract exhibits the same general effect toward all.

Broadly considered, the invention is applicable to the treatment of sewage or sewage waters being disposed of or processed in any of various manners. For example, the invention contemplates treatment of sewage waters in relation to a conventional type of sewage plant wherein the waters are subjected to biological or bacteriological treatment and filtration and the residual water is passed into ponds for ultimate disposal in streams, lakes or to the ocean. As applied to such plants, the invention contemplates such treatment of the sewage waters as will supplement the biological processes therein, as by introducing the present treating agents to the feed stream going to the plant proper, or the treating agents may be introduced instead, or additionally, to the outlet water going to settling ponds or directly to relatively large volume disposal water bodies. As another example, the invention is applicable to the treatment of sewage waters in cesspools and septic tanks, either by introduction of the treating agents directly thereto or into connected toilets from which the agents are flushed.

The prevalent practices have been to ignore treatment of the waste water other than by allowing its prolonged aeration and oxidation in streams or atmospheric ponds prior to discharge of the water into a large stream, river or ocean, or to chlorinate the water to accelerate oxidation and disintegration through the putrifying stage. These practices have neither solved satisfactorily the odor problems nor carried biological disintegration of the organic matter to best advantage, nor have they avoided conversion of such matter to sediments and slimes which tend to accumulate as in the bottoms of ponds and seal off the ground against acceptance of desirable water seepage from the ponds.

The invention provides a method whereby putrifaction of the organic material is prevented, or arrested if started, and the material is caused to undergo a course of biological disintegration to a state of division such that ultimately it becomes freely dispersible in water, and consequently instead of remaining and depositing as a ground sealing sediment or slime, the residue "opens" to permit free penetration into the soil. And the water is caused to penetrate the soil not only by reason of the dispersibility of the residues, but also because of the soil penetrating powers of any residual soluble extract in the water, and soluble products of the biological disintegration of the organic materials.

In the preparation of fruit or vegetable produce for packaging and marketing, it is customary to wash the produce with water, or an aqueous solution, as by conveying the produce through a tank or vat containing water or the solution. Frequently final washing of the produce is preceded by its passage through a soaking vat containing a disinfectant solution serving to sterilize the surfaces of the fruit as well as any materials or organisms adhering thereto.

As applied to washing operations, the invention provides an improved washing solution having various advantages, among which are increased capacity for removing all foreign substances from the produce surfaces, as well as for maintaining the wash solution itself in a highly desirable condition by reason of the solubilizing or dispersion of all foreign organic matter, while leaving a minimum of bottom settlings, for the most part inorganic residue, which ordinarily may accumulate at an excessive rate necessitating too frequent cleaning out of the vat, by reason of the included organic bottom settlings.

Excellent results with respect both to cleansing of the produce and maintenance of desirable conditioning of the wash solution, have resulted in accordance with the invention from the introduction to the wash water of a small percentage, say in the neighborhood of 1 percent by volume, of a digested cactus extract. In the treatment of the waters run into atmospheric ponds from 3 to 50 parts of the extract per million parts of the water, have given the desired results. As will later appear, the extract is prepared by water leaching and prolonged digestion of soluble organic constituents of cactus plants. It appears that by reason of the processes of digestion, organic constituents in the extract are formed or converted to compounds having highly effective properties as cleansing agents and solvents for all the accumulations, i. e., dirt, oil, smudge, fungus growths and the like, which may be present on the fruit surfaces, as well as pronounced properties as solubilizing or dispersing agents which apparently tend to keep at least most of the removed organic materials effectively dispersed in the water, leaving a minimum of inorganic residue. And it has been particularly observed that the fermenting additive gives to the solution these properties while preventing or inhibiting any souring or putrifaction of the solution over an extended period of time.

I have found that the digested extracts of various desert plants are highly effective as additives for the treatment of all waters indicated in the foregoing. At the outset, I wish to distinguish between such extracts obtained by leaching of cactus plants by steam or near-boiling water, and the present materials which are leached and digested at about normal atmospheric temperatures. Where such plants are extracted with steam, hot or boiling water, their capacity for digestion as the present extract is prepared, is definitely destroyed and cannot serve the purposes of this invention. Tests have indicated that introduction to the wash or carrier water of the present digested extract, makes it possible to obtain cleansing, solubility and dispersion effects to better advantage than with any known extract otherwise similar, but obtained by high temperature leaching. Particular attention is directed to the fact that the present material, though possibly in a state of continuing digestion, remains indefinitely "sweet" in the sense that it does not degrade by a putrifying fermentation or other process.

In the broad contemplation of the invention, the desert plant sources may be any or all of the following: The liliaceae or desert plant lily family, specifically the yuccas and preferably the Mohave yucca or Spanish dagger; the zygophyllaceae or caltrop family and specifically the creosote bush (covillea) or greasewood; and the cactaceae or cactus family, of which the prickly pear species, and specifically pancake cactus, is preferred.

Generally speaking, any suitable physical step method may be used to water leach or extract water soluble constituents of the plants to produce a digestible solution. A preferred procedure, applicable to the preparation of a digested extract solution from any one of the aforementioned plants, or combinations thereof, is to physically reduce the plant to a more or less finely divided condition and then to leach out the water soluble constituents to produce a solution which undergoes digestion together with the pulp.

In preparation of the greasewood extract, the branches of the greasewood plant are put through a hammer mill, usually when the plant is in green condition, although the greasewood plant may be used at various different degrees of dryness. The hammer mill may be of the conventional type which reduces the plant to a short fibrous pulp passing for example a ½ to ¾ inch mesh screen. The characteristics of the greasewood plant are such that no appreciable or apparent juice is freed in the operation of converting the plant to a pulp.

In preparing the yucca or Spanish dagger, I preferably use the dry or dead plant for several reasons, among which are better surface contact between the disintegrated dry plant and water because of the tendency of the dry plant to break up into finely threaded or fibrous condition. Also the dry plant fibers cause less sudsing of the solution during the water leaching stage. As in the case of the greasewood, the yucca may be disintegrated in a hammer mill to convert the plant into a fibrous pulp passing through a ½ to ¾ inch mesh screen. As will be understood, the yucca and greasewood may be ground separately or together, and their water soluble constituents leached out in separate water solutions or together in the same water solution.

As illustrative, about 100 pounds of the individual pulps may be contacted each with around 150 galons of water, as by placing a porous sack containing the pulp in a body of the water. Where the two pulps are to be leached simultaneously, a 100 pound mixture thereof may be leached in around 150 gallons of water. The solution is allowed to stand and digest, preferably while the pulp remains in the water, over a period of time sufficient for a bacteriological or biological conversion to start and progress to completion or to a satisfactory degree, over an extended period. The leaching operation may occur at ordinary atmospheric temperatures and over a period of five to seven days, or longer into a period of weeks, at the end of which time the solution will have attained a state of satisfactory digestion. It is contemplated that the digestion may be accelerated, e. g. during colder atmospheric conditions, as by heating of the solution; also that digestion of the pulp may be allowed to progress for a considerable period of time after initiation of active conversion.

A digested solution of the cactus or prickly pear extract may similarly be prepared by passing the "pears" through an ordinary food chopper which reduces the plant to say ¼ to ½ inch pieces or slices. The resulting pulp then may be sacked and leached in water at a pulp to liquid ratio of say around 50 pounds of pulp to 150 gallons of water. The water to cactus pulp ratio may be such that the resulting extract solution assumes a viscous and stringy consistency. As with the other extracts, the cactus extract is allowed to stand until active digestion has started and continued over a period of time. It is contemplated that wherever desirable, the three plant pulps may be leached in the same water solution and with resulting extracts digested together. Excellent results have been obtained using a final product composed of substantially equal parts of the digested extracts of the three pulps.

In some instances it may be found advantageous to add to the biological or mineral balance of the cactus extract by the inclusion in the digestion processes of other plants, e. g. either or both kelp and alfalfa. Quantitatively, each may be added in ground form and in amounts up to 10 pounds in the pulp compositions described.

The digested material may be added to the wash water in or going into a wash vat or tank in any desired proportion, ordinarily about one percent by volume, of the water. During washing of the produce, as by conveying it through the wash water, the latter may be heated, say to a temperature about 100° F. to 120° F.

The aforementioned as well as additional methods and steps in the preparation of the digested extract, and the manner in which it may be introduced to wash or carrier or the pond water, will be more fully understood from the following description of certain procedures applying typically to the treatment of vegetable waste waters, illustrated by the accompanying drawing in which:

Fig. 1 shows diagrammatically a system for subjecting the pulp and solution to progressive digestion in a series of stages; and Fig. 2 illustrates diagrammatically an instance where the extract is used for treating vegetable matter-containing waters going to an atmospheric pond.

Referring first to Fig. 1, the initially prepared pulp materials 10 may be placed in bags, as referred to in the foregoing, or upon trays 11 immersed in a body of water 12 within a first digesting tank 13 in open exposure to the atmosphere and maintained at about atmospheric temperatures. Following a period of several days digestion in the tank 13 some or all of the partially digested solution 12 may be pumped through line 14 to a second tank 15 containing trays 16 carrying the pulp 17, for several days continued digestion. Thereafter the solution 18 may be transferred through line 19 to one or more successive tanks 20, likewise containing trays 21 carrying the pulp 22. Thus the liquor undergoes continuing digestion over at least several days and if desired several weeks time, continuously within however many tank stages as may be desired.

The pulp 17 and 22 used in the later digestion stages 15 and 20, preferably is incompletely digested pulp transferred from a preceding stage or the initial tank 13. For example, after several days digestion, some or all of the pulp 10 may be transferred to either or both tanks 15 or 20, or the pulp 10 may be transferred to tank 15 and the pulp from tank 15 transferred to tank 20, all to the end that generally speaking, as the liquor in flowing serially through the digestion stages becomes more concentrated, its continuing digestion occurs in the presence of pulp that is more or most advanced in its state of digestion and disintegration. Thus by the pulp transference and continuance of the digestion processes over extended periods of time, the pulp may be caused to undergo a state of ultimate digestion and disintegration to a point such that it becomes solubilized almost entirely, leaving but small amounts of mainly inorganic residues in the tanks.

During the digestive cycle it is found desirable to subject the liquor to some degree of aeration in addition to atmospheric surface exposure in the tanks. For this purpose some or all of the liquor being transferred between two or more of the tanks, may be pumped through a side line 23 and discharged in open exposure to the atmosphere over an aerating or filming medium, which may consist of one or more trays 24 containing pulp 25 obtained from any of the tanks.

At times, and particularly where the raw pulp materials are more green or juicy than at other times, signs of incipient putrifaction may develop in the first tank 13. Such putrifaction may be promptly arrested by the action of any of the more completely digested pulps in tanks 15 or 20, upon the liquor contained in tank 13. Thus, relatively small quantities of either or both the pulps 17 and 22 may be transferred into tank 13 when signs of putrifaction develop. Also the same effect may be accomplished by the use of pulp 25 from the aerator tray 24.

Referring to Fig. 2, a typical produce packing plant or cannery may contain a washer diagrammatically indicated at 26 through which water is being supplied through line 27 and from which the wash water goes through line 28 to a settling pond 29 which, ordinarily, will be an earth pond from which the water unless inhibited, will seep into the ground. As discussed in the foregoing, the digested extract may be introduced to the water ahead of the washer, as through line 30, or directly into the washer through line 31. Where the object of the extract use may be simply to treat the water going from the washer to the pond, the extract may be introduced through line 32 to the plant refuse stream, for continued bacteriological or biological action on the organic matters contained in the pond water. Successful results have been accomplished by the introduction of between 3 to 50 parts of the extract per million parts of the water going to the pond. The same proportions are effective in the treatment of sewage water in ponds. As previously discussed, whereas ordinarily in the case of untreated or chlorinated pond waters, the organic residues tend to accumulate as sediments or slimes sealing off the bottom surface of the pond against water release to the ground, the added effect of the extract is to accomplish what appears to be a digestion, solubilizing and dispersion of such sediment and slimes, to the extent of releasing the pond water for penetration into the soil, which penetration is further promoted by the highly effective soil penetrating properties of the extract itself.

In referring to the present material generally as a digested product, I do so because of the lack of obtainable knowledge of the exact bacteriological, biological or enzymatic processes involved in the conversion of the natural juices and pulp to the final product. Possibly some kind of fermentation enters into the conversion, although the occurrence of ordinary fermentation is seemingly confined or denied by the stability of the digested material with respect to gasification. Accordingly, "digestion" or "fermentation" is intended to define a condition of microorganism (mold, bacterial or enzymatic) activity existing within the material in life cycles, and continuing from the time of its initial extraction and digestion, according to which new organisms are progressively being created and cultivated as others expire. During the extraction stage, some indications of fermentation may be evidenced by the formation of gas bubbles in the water solution of the dissolved plant solubles. Subsequently, as when the product has digested to the condition in which it is barreled or otherwise packaged for distribution, gas generation within the material may have substantially ceased, but the bacteriological or biological processes nevertheless seem to continue, as may be indicated by the development of visible growth or residues. To illustrate, products have been made in which a substantially clear quantity of the material separated from solid residue following digestion, in the course of time will develop a growth or residue in the nature of a "mother," thus establishing the continuity of the microorganic life cycle in the material. It is important to again observe, as previously indicated, that the digestion or fermentation is not of a kind resulting in purefaction of the material as would otherwise result from an extraction procedure (e. g. high temperature) initially resulting in the killing of the mold, bacterial and enzymatic life in the extract.

This application is a continuation-in-part of my co-pending application, Ser. No. 127,275, filed November 14, 1949, on "Produce Washing Material" now abandoned.

I claim:

1. The method of treating waters subject to contamination by putrifiable organic materials contained therein, that includes introducing to the water a non-putrifying aqueous extract prepared by disintegration and water leaching of a desert plant material of the group consisting of prickly pear cactus, greasewood, and yucca plants. allowing the resulting aqueous solution to digest over an extended period in excess of one week together with the fibrous plant pulp, and thereafter separating the resulting liquid for use as the extract.

2. The method as defined in claim 1, in which said water leaching and digestion occur at about atmospheric temperatures.

3. The method as defined in claim 1, in which a stream of said solution is subject to aeration during the digestion.

4. The method as defined in claim 1, in which the solution during digestion is passed through a plurality of digestion zones containing said pulp.

5. The method as defined in claim 1, in which the solution is passed successively through a plurality of pulp-containing digestion zones in progressively and increasingly digested condition, the first zone containing pulp that is less digested than the pulp in a subsequent zone.

6. The method as defined in claim 1, in which the solution is passed successively through a plurality of pulp-containing digestion zones, and any tendency toward incipient putrifaction of the solution in an antecedent zone is arrested by the introduction thereto of pulp from a subsequent zone.

7. The method as defined in claim 1, in which the solution is passed successively through a plurality of pulp-containing digestion zones, and a relatively small quantity stream of said solution is subject to aeration by intimate exposure to the atmosphere during the period of its digestion in said zones.

8. The method as defined in claim 1, in which the plant material leached includes quantities of each of said prickly pear cactus, greasewood and yucca plants.

9. The method as defined in claim 1, in which said waters contain sewage.

10. The method as defined in claim 1, in which said putrifiable materials are vegetable wastes.

11. The method as defined in claim 1, in which said extract is added to the water before introduction of the putrifiable organic materials thereto.

12. The material as defined in claim 1, in which said extract is added to the water after introduction of the putrifiable organic material thereto.

13. The method as defined in claim 1, in which the water containing the putrifiable organic material and extract are mixed and maintained in an atmospheric pond receiving the water from an industrial plant.

14. The method as defined in claim 1, in which the putrifiable organic material-containing water is discharged from an industrial plant into a pond for prolonged action of the extract and the extract is introduced to the water after it receives the organic material.

15. The method as defined in claim 1, in which the water to which the extract is added is derived from a sewage treating plant and is held in a pond to allow prolonged action of said extract on the sewage.

References Cited in the file of this patent

UNITED STATES PATENTS

| | | |
|---|---|---|
| 134,876 | Fellner | Jan. 14, 1873 |
| 1,237,267 | Carmona | Aug. 14, 1917 |
| 2,117,378 | Tiffany | May 17, 1938 |
| 2,430,519 | Mallory | Nov. 11, 1947 |